United States Patent
Boyce

(10) Patent No.: US 7,503,429 B2
(45) Date of Patent: Mar. 17, 2009

(54) ACOUSTIC PANEL ASSEMBLY

(75) Inventor: Dean Arden Boyce, Waterloo, IA (US)

(73) Assignee: Deere & Company, Moline, IL (US)

( * ) Notice: Subject to any disclaimer, the term of this patent is extended or adjusted under 35 U.S.C. 154(b) by 55 days.

(21) Appl. No.: 11/693,443

(22) Filed: Mar. 29, 2007

(65) Prior Publication Data

US 2008/0238121 A1 Oct. 2, 2008

(51) Int. Cl.
*B60R 13/08* (2006.01)
(52) U.S. Cl. .................. 181/290; 181/284; 181/286; 181/210; 181/211; 296/39.3; 296/211; 296/191
(58) Field of Classification Search ............... 181/284, 181/286, 290, 210, 211; 296/39.3, 211, 191
See application file for complete search history.

(56) References Cited

U.S. PATENT DOCUMENTS

| | | | | |
|---|---|---|---|---|
| 4,475,765 | A * | 10/1984 | Vogt et al. .................. 296/210 |
| 6,499,797 | B1 * | 12/2002 | Bohm et al. ................ 296/191 |
| 6,656,397 | B1 * | 12/2003 | Hansen et al. ............. 264/45.4 |
| 6,669,265 | B2 * | 12/2003 | Tilton et al. ............... 296/146.1 |
| 6,971,475 | B2 * | 12/2005 | Tompson et al. ........... 181/204 |
| 6,986,543 | B2 * | 1/2006 | Reed ............................ 296/153 |
| 2003/0188492 | A1 * | 10/2003 | Bonnett et al. ............... 49/502 |
| 2004/0113455 | A1 * | 6/2004 | Schmidt .................. 296/146.6 |
| 2004/0231784 | A1 * | 11/2004 | Morrison et al. ............ 156/245 |
| 2005/0126848 | A1 * | 6/2005 | Siavoshai et al. ........... 181/207 |

* cited by examiner

*Primary Examiner*—Walter Benson
*Assistant Examiner*—Jeremy Luks

(57) ABSTRACT

The invention relates to an acoustic panel assembly. There is a need for a simple and inexpensive acoustic panel assembly. An acoustic panel assembly includes a parent panel and an insert panel. The parent panel has a higher density body and a sound reflecting skin. The insert panel is mounted to the parent panel, and includes a sound absorbing body, a lower density rim and a sound transmitting skin. The parent panel includes a border portion which surrounds an opening which engages an outer edge of the insert panel. The border portion and the edge engage each other and form an interlocking joint. The border portion defines an annular groove which receives the outer edge of the insert panel. The body of the parent panel comprises a higher density expanded polypropylene material, and rim body of the insert panel comprises a lower density expanded polypropylene material.

7 Claims, 7 Drawing Sheets

ACOUSTIC PANEL ASSEMBLY

FIELD OF THE INVENTION

The present invention relates to panel assembly including an expanded polypropylene (EPP) panel and an acoustical panel.

BACKGROUND OF THE INVENTION

It is known to provide vehicles with interior panels made out of expanded polypropylene (EPP). In agricultural vehicles, there is a need for interior panels which absorb sound and reduce noise level in the vehicle cab. However, EPP panels do not reduce noise levels in a vehicle interior.

It is known to attach acoustical material to interior panels. But, this requires secondary operations to mechanically fasten and/or adhesively bond the acoustical material to the back of the panels. These secondary operations complicate the assembly process, create additional cost, and result in a less reliable assembly.

A simpler, lower cost sound absorbing panel assembly is desired.

SUMMARY OF THE INVENTION

Accordingly, an object of this invention is to provide a simple low cost acoustical panel assembly.

This and other objects are achieved by the present invention, wherein an acoustic panel assembly includes a parent panel and an insert panel. The parent panel has a higher density parent body and a sound reflecting skin bonded to the surface thereof. The insert panel is mounted to the parent panel, and includes a sound absorbing insert body, a lower density rim body surrounding the insert body and a sound transmitting insert skin bonded to at least a portion of an outer surface of the main and rim bodies.

The parent panel includes a border portion which surrounds an opening which engages an outer edge of the insert panel. The border portion and the edge engage each other and form an interlocking joint. The border portion defines an annular groove which receives the outer edge of the insert panel. The body of the parent panel comprises a higher density expanded polypropylene material, and rim body of the insert panel comprises a lower density expanded polypropylene material.

DESCRIPTION OF THE PREFERRED EMBODIMENT

Figure 1:
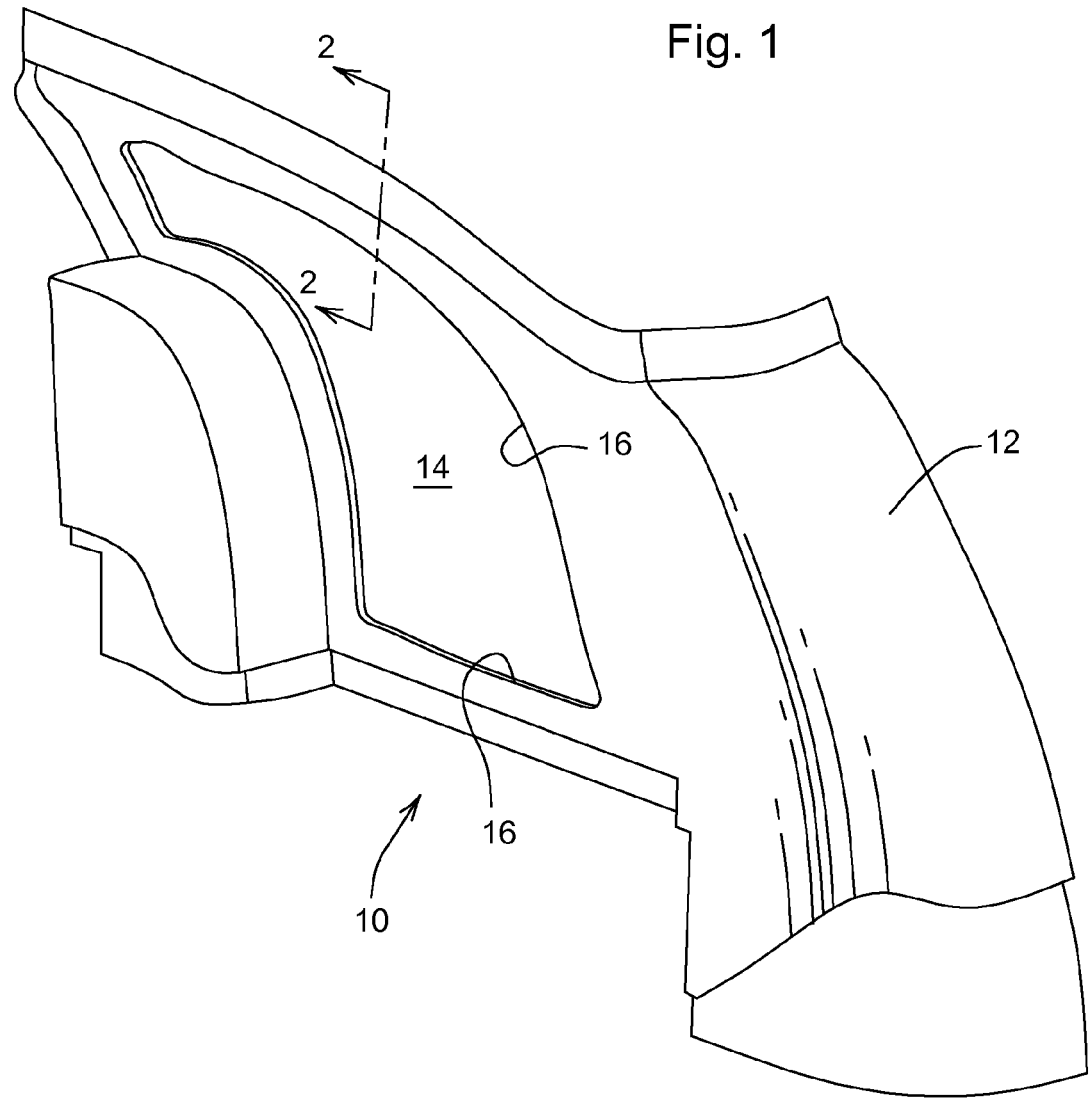
FIG. 1 is a perspective view of a panel assembly according to the present invention.
Figure 2:
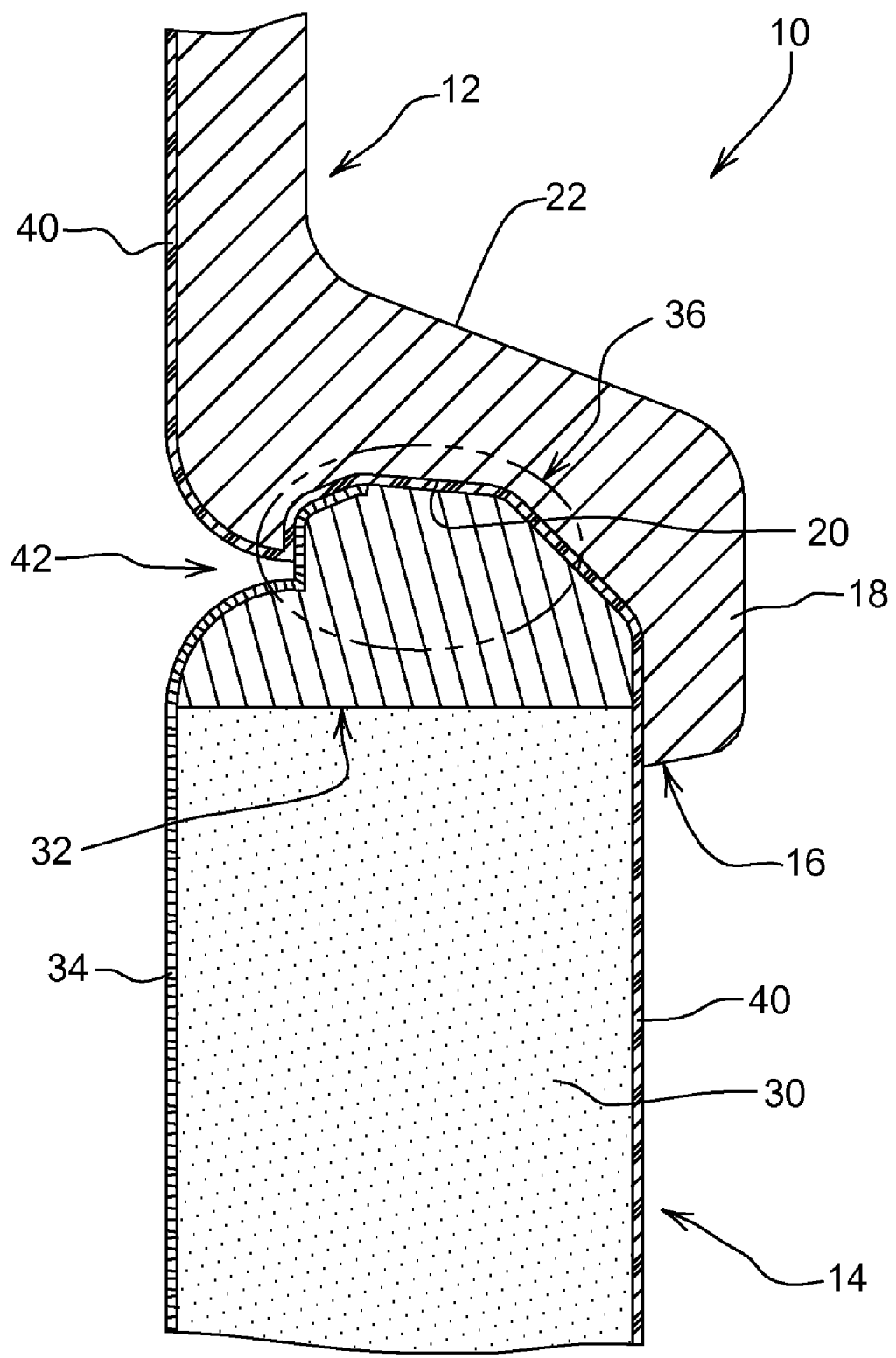
FIG. 2 is a view taken along lines 2-2 of FIG. 2.

Referring to FIGS. 1 and 2, the panel assembly 10 includes a parent panel 12 and an insert panel 14 which is mounted or received in an opening 16 in the parent panel 12. The opening 16 is surrounded by a border portion 18 formed by the parent panel 12. An inwardly opening annular recess or groove 20 is formed in the border portion 18. The parent panel 12 includes a body 22 preferably formed out of high density expanded polypropylene. The annular groove 20 has a bottom surface which faces radially inwardly and which engages the outer edge of the insert panel 14.

The insert panel 14 includes a sound absorbing main body 30, a lower density rim body or frame 32 surrounding the main body 30 and a sound transmitting insert skin 34 bonded to at least a portion of an outer surface of the main body 30 and the rim body 32. The border portion 18 engages the outer edge portion of the rim body 32 of the insert panel 14, and the border portion 18 and the rim body 32 form an interlocking joint 36. The side of the insert panel visible in FIG. 1 is preferable a finished surface. The skin 34 is preferably a woven or non-woven cloth or a perforated vinyl. The porous (to sound) skin 34 will allow sound waves to pass to the acoustical absorbing body 30 placed behind the skin.

A non-porous (sound reflecting) skin 40 is bonded to both the parent panel 12 and to the insert panel 14. The skin 40 is bonded to the visible side of the parent panel 12 and is bonded to the non-visible side of the insert panel 14. The skin 40 is also bonded to both the border portion 18 of the parent panel 12 and to the rim body 32 of the insert panel 14 throughout the joint 36. A portion of the skin 40 overlaps and is bonded to a portion of the insert skin 34. Because through the joint 36 both sides of the skin 40 are bonded to the parent panel 12 or to the insert panel 14, this assembly requires no secondary fasteners or adhesives to complete the assembly. The skin 34 preferably has a finished visible surface, and is permanently bonded to the low density EPP soft rim 32 of the desired shape. The rim 32 has a molded-in shape which forms the interlocking joint 36 with the inner surface of the border portion 18 of the parent panel 12. On the visible or finished side of the joint 36, the parent panel 12 and the insert panel 14 form a "coach" joint 42.

Figure 3:
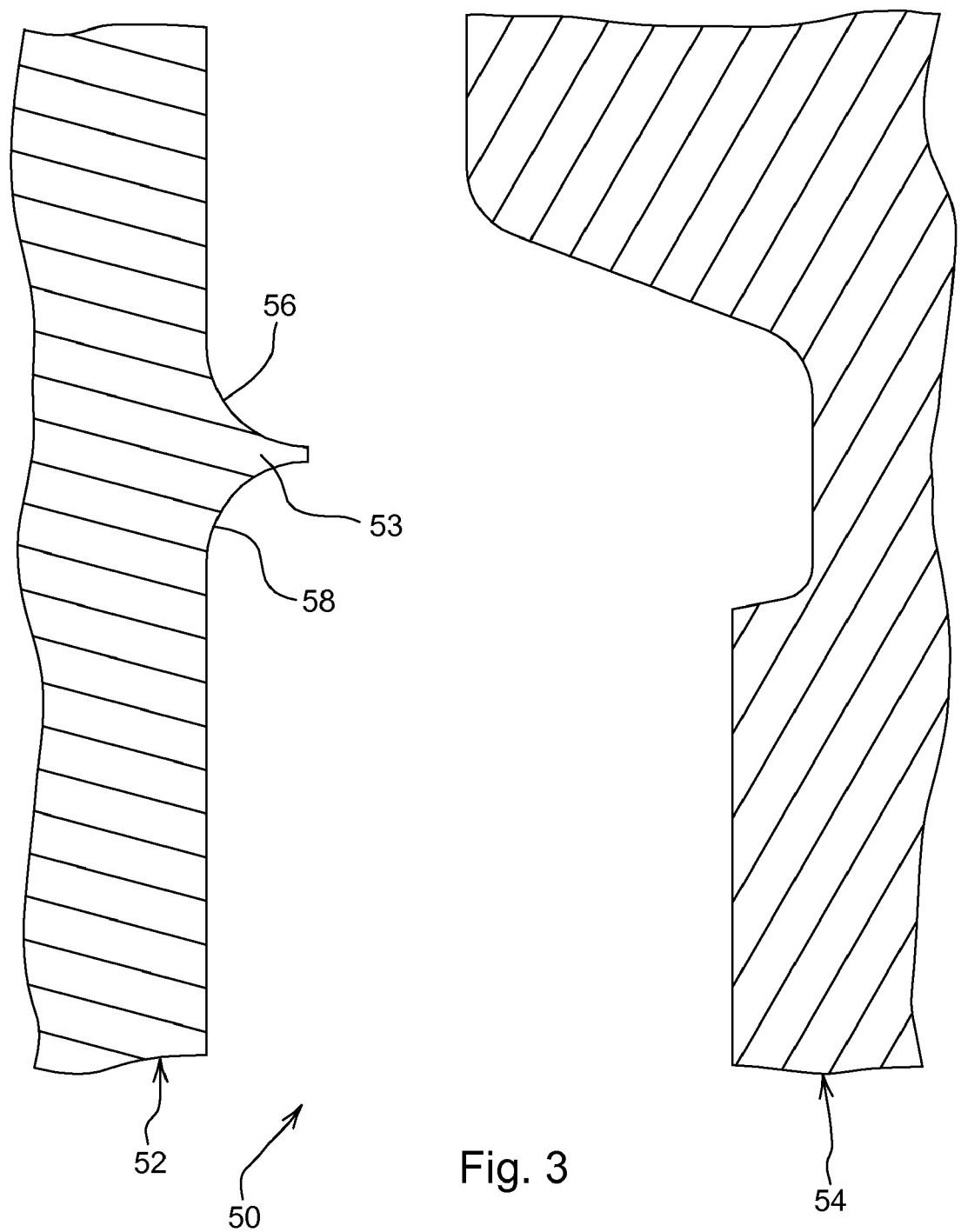
FIG. 3 is a sectional view of a mold assembly for making the panel assembly of FIGS. 1 and 2.

Referring now to FIG. 3, the panel assembly 10 is preferably made in a mold assembly 50 which includes a front or finished side mold tool 52 and a back or unfinished side mold tool 54. Tool 52 includes a rib 53 which forms a pair of concave surfaces 56 and 58 which form the coach joint 42. The insert panel 14, including the insert skin 34, is placed against mold tool 52 with rim body 32 engaging concave surface 58. The rib 53 locates the insert panel 14 in the tool and provides the form for the parent panel portion of the coach joint 42.

Figure 4:
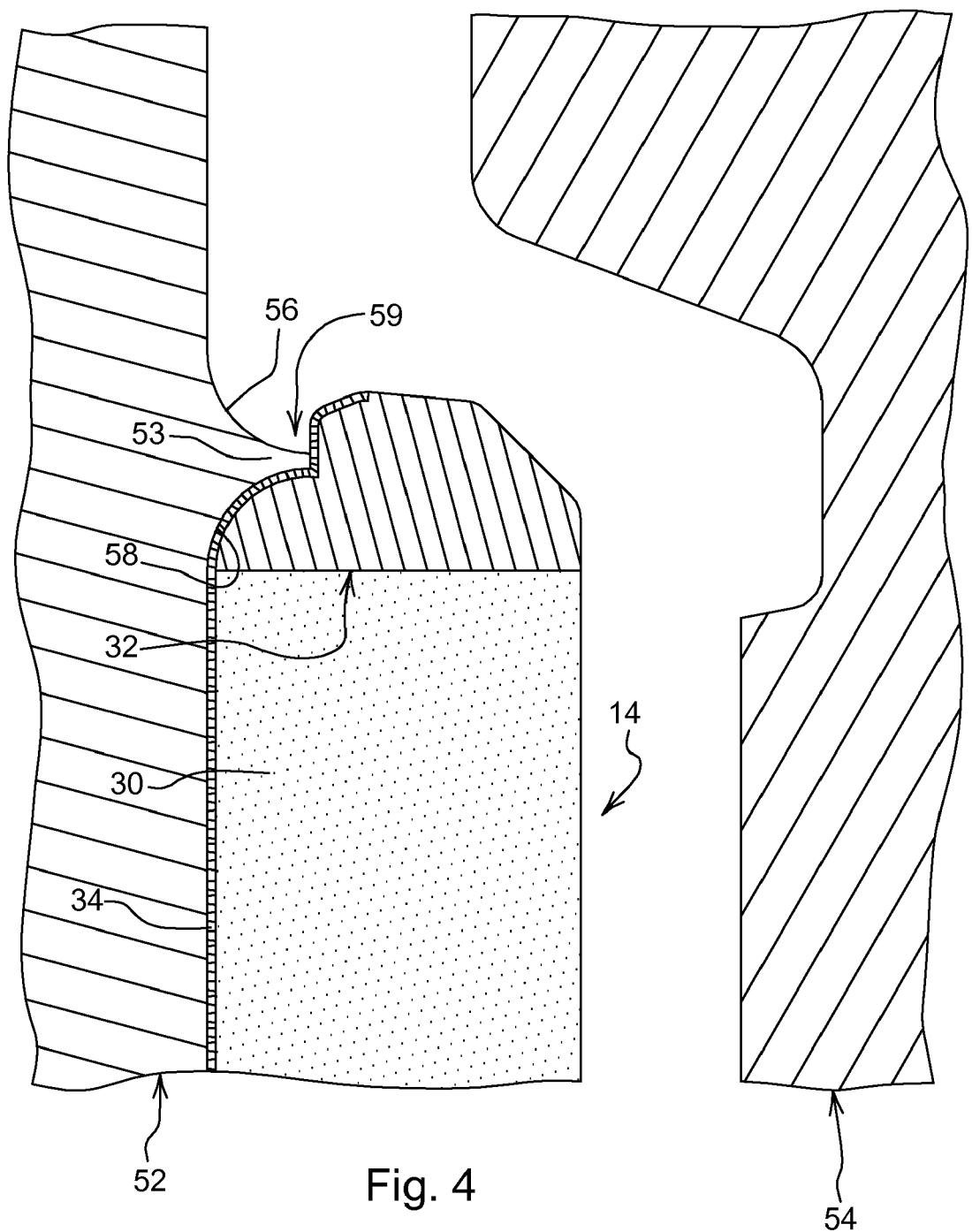
FIG. 4 is a sectional view of the mold assembly of FIG. 3 including an insert panel.

Referring now to FIG. 4, the insert panel rim body 32 portion is placed against surface 58 of rib 53 of mold tool 52. Then, the acoustical material body 30 is then loaded into the cavity surrounded by the rim body 32. A V-shaped groove 59 is formed between the insert panel rim body 32 and surface 56 of rib 53.

Figure 5:
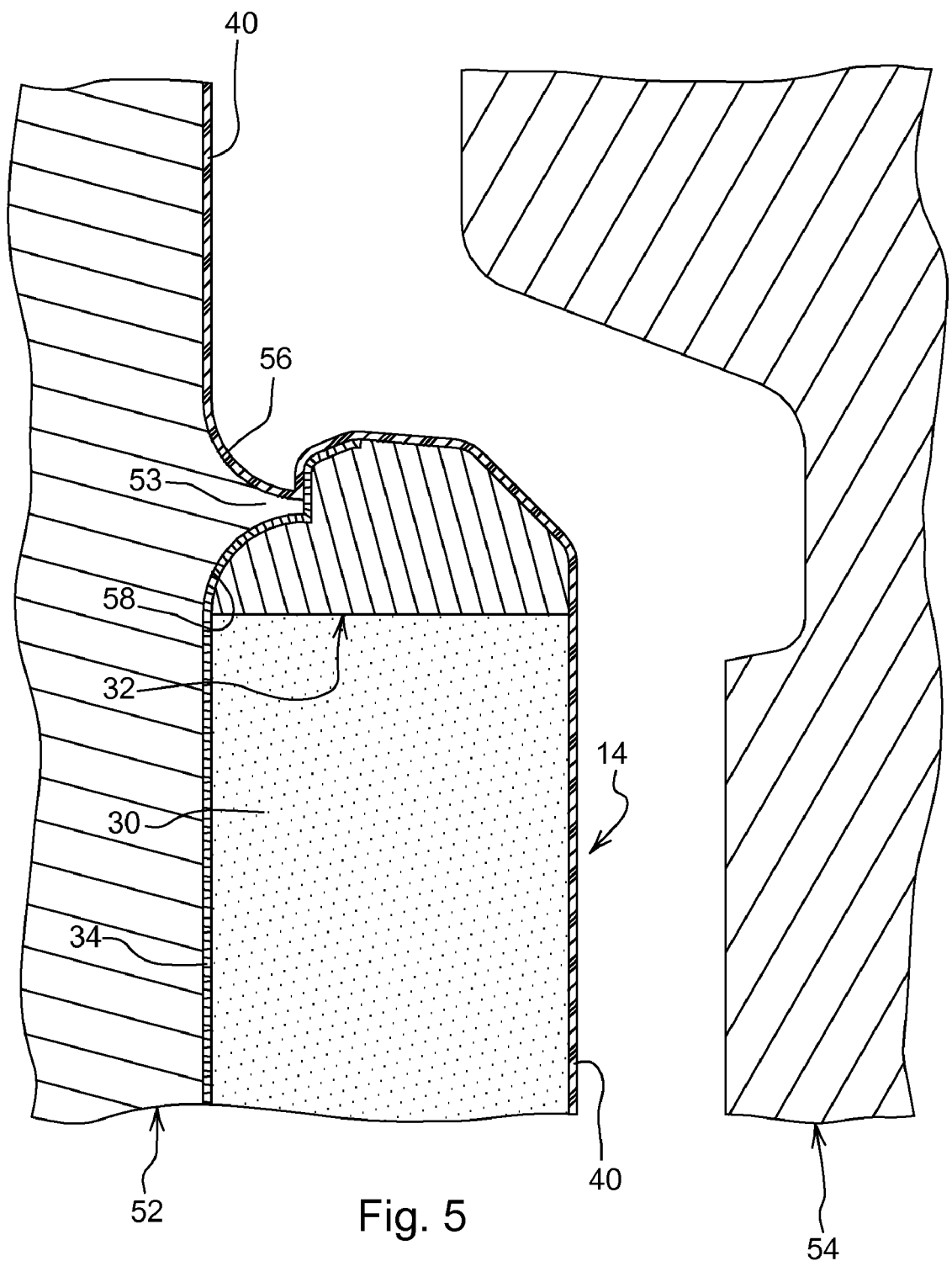
FIG. 5 is a sectional view of the mold assembly of FIG. 3 including the insert panel and a sound reflecting skin.

Referring now to FIG. 5, the skin 40 is heated to the forming temperature and formed over the insert panel 14 (including the back side of the acoustical material 30) and over the remaining exposed surface of mold tool 52. The skin 40 flows around the male joint portion of the insert panel 14 as the skin 40 is drawn by vacuum towards the surface of mold tool 52. Preferably, the rim body 32 is shaped so that the width and depth of the V-shaped groove 59 will allow the skin 40 to be pulled into the groove 59 and properly bond to the surfaces of the groove 59.

Figure 6:
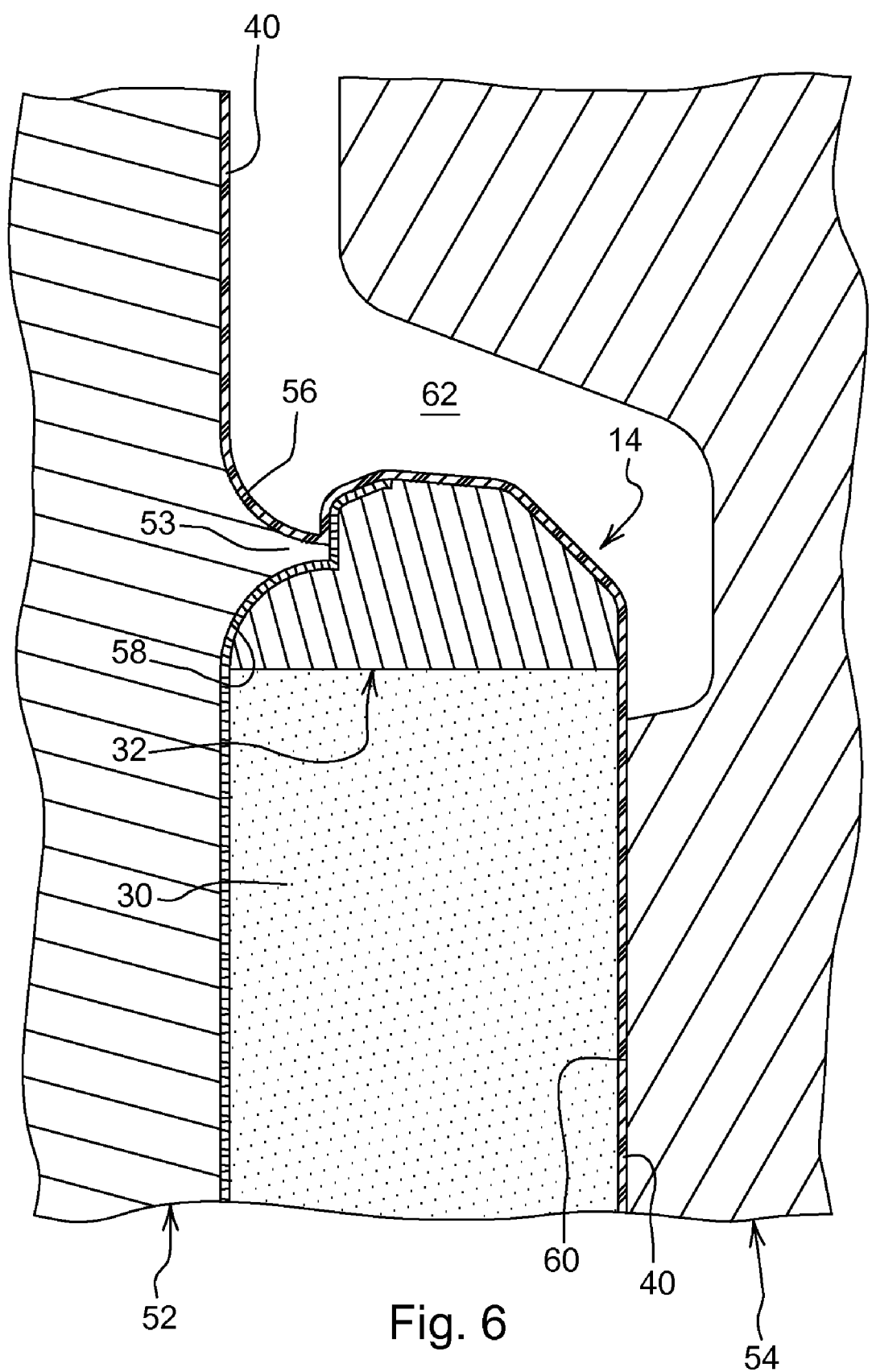
FIG. 6 is a sectional view of the mold assembly of FIG. 5 with the back side mold tool engaged against the skin on the insert panel.

Referring now to FIG. 6, the mold tool 54 is moved into position with shoulder 60 engaging the skin 40 on the back side of the insert panel 14. The mold tools 52 and 54 and the insert panel 14 thereby form a mold cavity 62.

Figure 7:
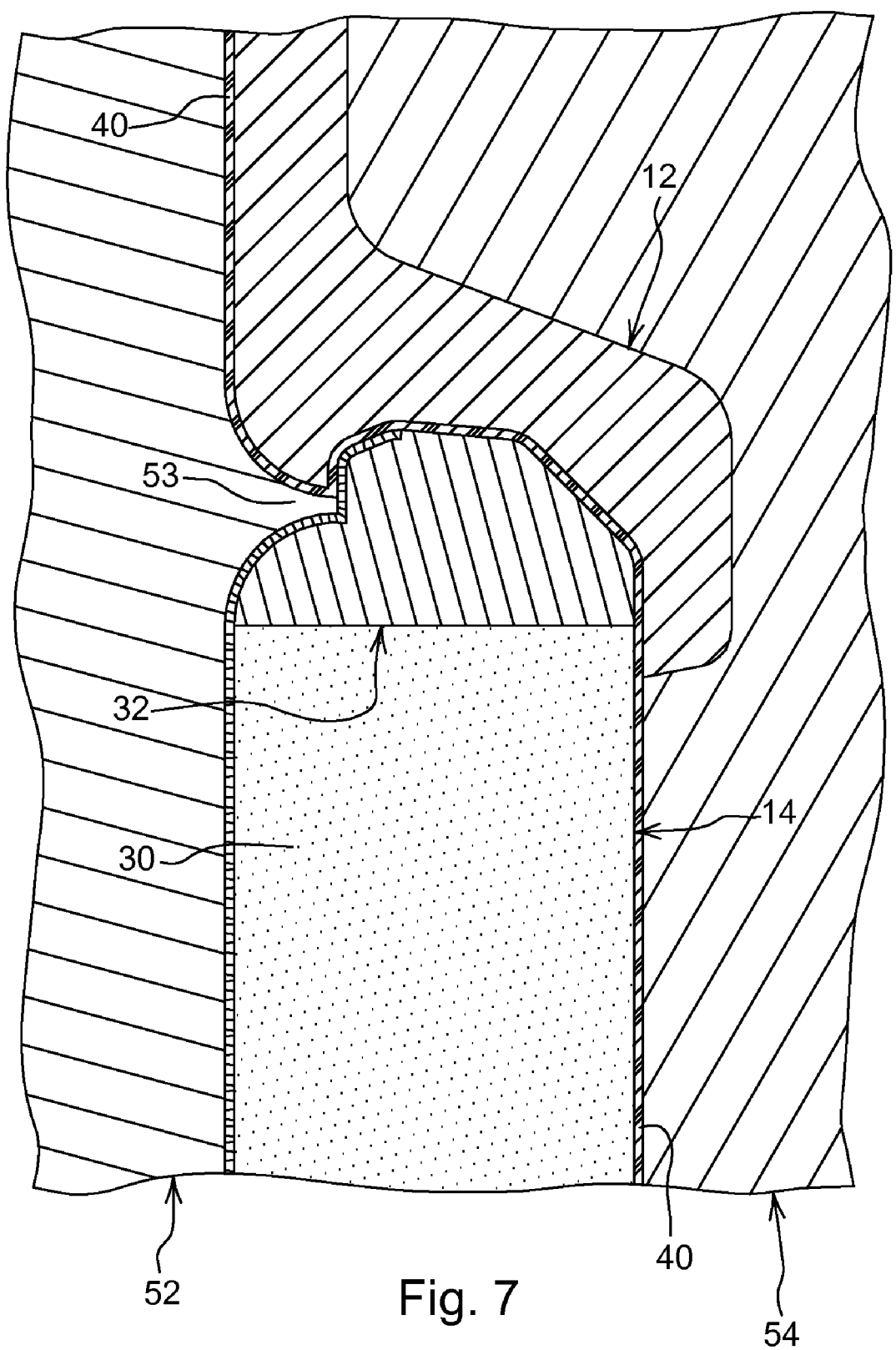
FIG. 7 is a sectional view of the mold assembly of FIG. 6 with the parent panel material in the mold cavity.

Referring now to FIG. 7, EPP beads are then blown into the cavity 62. Steam is then applied through the rear side of the mold to swell and soften the beads. The mold is then fully closed to compress the EPP to the final shape. The cavity 62 for the EPP enclosed by mold tool 54 mold extends over the inside edge of the insert panel 14 and thereby forms a back wall of the interlocking joint 36 and retains the acoustical material 30 placed in the insert panel 14 prior to molding the parent panel 12. The high density EPP thereby forms the parent panel 12 and completes the coach joint 42. The parent panel 12 is thereby bonded directly to the skin 40 and indirectly to the insert panel 14. The outer peripheral half of the joint 42 is formed as the parent panel 12 is molded.

After de-molding the parent panel 12, the perimeter is trimmed with a water jet to remove the excess skin therefrom. The part of the skin 40 which covers the back side of the acoustical body 30 may be removed if desired for additional sound control. Otherwise, the part of the skin 40 which covers the back of the acoustical body 30 will act as a barrier to sound. A sound wave impinging on the porous skin 34 will pass through the acoustical body 30 and reflect off any part of the skin 40 which remains on the back side of the acoustical body 30. The sound wave would then pass through the acoustical material a second time effectively doubling the acoustical properties of the panel assembly 10.

The result is a panel assembly 10 with a molded-in insert panel 14 with acoustical properties. The combination of the barrier properties of the parent panel finished surface skin 40 and the acoustical properties of the insert panel 14 provide a greater sound reduction within the operator enclosure as a system than the individual components would produce. The integrated locking features of the insert panel 14 combined with the EPP process provides a durable, reliable, and aesthetically pleasing joint between the insert panel 14 and parent panel 12 without the use of secondary fasteners or adhesives. This results in lower cost for materials and assembly labor. Such a panel assembly may be used for any interior surface of a cab or operator station for an off-road or automotive vehicle, as well as architectural interior panel applications.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An acoustic panel assembly comprising:
   a parent panel;
   an insert panel mounted to the parent panel, the insert panel having a sound absorbing main body, a rim body surrounding the main body and a sound transmitting insert skin bonded to at least a portion of an outer surface of the main and rim bodies;
   a sound reflecting skin bonded to a portion of an outer surface of the parent body and bonded to a portion of an outer surface of the insert panel; and
   the parent panel including an opening surrounded by a border portion, the border portion engaging an outer edge of the insert panel, the border portion and the edge forming an interlocking joint, the border portion defining an annular groove which receives the outer edge of the insert panel, the annular groove having a bottom surface which faces radially inwardly and which engages the outer edge of the insert panel.

2. The panel assembly of claim 1, wherein:
   the parent panel body comprises a higher density material, and the rim body comprises a lower density material.

3. The panel assembly of claim 1, wherein:
   the parent panel body comprises high density expanded polypropylene; and
   rim body comprises low density expanded polypropylene.

4. The panel assembly of claim 1, wherein:
   the parent panel having a higher density parent body; and
   the insert panel having a lower density rim body surrounding the main body and a sound transmitting insert skin bonded to at least a portion of an outer surface of the main and rim bodies.

5. The panel assembly of claim 1, wherein:
   the parent panel surrounds the insert panel.

6. The panel assembly of claim 1, wherein: the sound reflecting skin is bonded to a portion of the insert skin.

7. The panel assembly of claim 1, wherein:
   the sound reflecting skin is bonded to a visible side of the parent panel and to a non-visible side of the insert panel.

* * * * *